United States Patent
Corley et al.

(10) Patent No.: US 9,942,740 B2
(45) Date of Patent: Apr. 10, 2018

(54) METHOD AND APPARATUS FOR PROVIDING CUSTOMIZATION OF PUBLIC SAFETY ANSWERING POINT INFORMATION DELIVERY

(71) Applicant: Sirius XM Connected Vehicle Services Inc., Irving, TX (US)

(72) Inventors: Gregory Charles Corley, Double Oak, TX (US); Tod Farrell, Coppell, TX (US); Barry Garrison, Lewisville, TX (US); Scott Nelson, Dallas, TX (US); Thomas Barton Schalk, Plano, TX (US)

(73) Assignee: Sirius XM Connected Vehicle Services Inc., Irving, TX (US)

( * ) Notice: Subject to any disclaimer, the term of this patent is extended or adjusted under 35 U.S.C. 154(b) by 13 days.

(21) Appl. No.: 15/457,635

(22) Filed: Mar. 13, 2017

(65) Prior Publication Data
US 2017/0188218 A1   Jun. 29, 2017

Related U.S. Application Data

(62) Division of application No. 14/209,120, filed on Mar. 13, 2014, now Pat. No. 9,648,477.

(60) Provisional application No. 61/782,771, filed on Mar. 14, 2013.

(51) Int. Cl.
*H04M 11/04* (2006.01)
*H04W 4/22* (2009.01)
*G10L 15/26* (2006.01)
*H04W 4/04* (2009.01)

(52) U.S. Cl.
CPC ............. *H04W 4/22* (2013.01); *G10L 15/26* (2013.01); *H04W 4/046* (2013.01)

(58) Field of Classification Search
CPC .............................. H04W 4/22; H04W 4/046
See application file for complete search history.

(56) References Cited

U.S. PATENT DOCUMENTS

| | | | |
|---|---|---|---|
| 5,208,756 A | 5/1993 | Song | |
| 7,177,397 B2 | 2/2007 | McCalmont et al. | |
| 7,406,321 B2 | 7/2008 | Beiermeister | |
| 7,904,219 B1 | 3/2011 | Lowrey et al. | |
| 8,340,629 B2 | 12/2012 | Burt et al. | |
| 8,423,366 B1 | 4/2013 | Foster et al. | |
| 2003/0086539 A1* | 5/2003 | McCalmont | H04M 3/42 379/45 |

(Continued)

OTHER PUBLICATIONS

International Search Report and Written Opinion of PCT/US14/27349 dated Aug. 20, 2014.

*Primary Examiner* — Thomas Lett
(74) *Attorney, Agent, or Firm* — Mayback & Hoffman, P.A.; Gregory L. Mayback; Rebecca A. Tie

(57) ABSTRACT

A method and system for providing emergency call (e-call) services is disclosed. A third-party service center receives a communication from a vehicle over a communication pathway. Signaling is automatically sent to the vehicle from the third-party service center over the communication pathway. Location information is received from the vehicle at the third-party service center in response to the signaling. Information is forwarded from the voice call and the location information to a public safety answering point (PSAP) determined by the third-party service center.

18 Claims, 12 Drawing Sheets

(56) References Cited

U.S. PATENT DOCUMENTS

| | | |
|---|---|---|
| 2003/0109245 A1* | 6/2003 | McCalmont ............ H04L 12/66 |
| | | 379/45 |
| 2003/0154085 A1 | 8/2003 | Kelley |
| 2004/0184584 A1* | 9/2004 | McCalmont ............ H04M 3/42 |
| | | 379/45 |
| 2004/0202291 A1 | 10/2004 | Skinner |
| 2005/0118983 A1 | 6/2005 | Van Camp |
| 2007/0038459 A1 | 2/2007 | Zhou et al. |
| 2009/0274145 A1 | 11/2009 | Laliberte |
| 2011/0065416 A1 | 3/2011 | Burt et al. |
| 2011/0086607 A1 | 4/2011 | Wang et al. |
| 2011/0298613 A1 | 12/2011 | Ben Ayed |
| 2012/0264395 A1* | 10/2012 | Bradburn ............ H04M 3/5233 |
| | | 455/404.1 |
| 2013/0040599 A1 | 2/2013 | Berg et al. |
| 2013/0226369 A1* | 8/2013 | Yorio ..................... G06F 17/00 |
| | | 701/1 |

* cited by examiner

METHOD AND APPARATUS FOR PROVIDING CUSTOMIZATION OF PUBLIC SAFETY ANSWERING POINT INFORMATION DELIVERY

CROSS-REFERENCE TO RELATED APPLICATIONS

The present application is a divisional of U.S. patent application Ser. No. 14/209,120, filed on Mar. 13, 2014, which application claims priority to U.S. Provisional Patent Application No. 61/782,771, filed on Mar. 14, 2013, the entire disclosures of which are hereby incorporated herein by reference in their entireties.

STATEMENT REGARDING FEDERALLY SPONSORED RESEARCH OR DEVELOPMENT

Not Applicable

FIELD OF THE INVENTION

The present invention lies in the field of telecommunications. The present disclosure relates to providing emergency communications using an automated emergency call solution.

BACKGROUND OF THE INVENTION

Motor vehicle emergency call systems are known in which a person in distress can get relatively immediate aid and rescue following a vehicle accident or other emergency situation that occurs while the vehicle is on a roadway. Specifically, in such systems, a wireless radio transmitter or transponder box is installed and located somewhere inside the vehicle and, based upon pre-determined circumstances or events, for example, deployment of an airbag, immediately and automatically generates and transmits a radiating distress signal or voice call to one or more remotely located central call centers or stations that, typically, have a standby dispatch system manned by call center personnel. Thus, vehicle emergency call systems provide an invaluable lifesaving advantage by initiating an emergency signal almost instantaneously and in circumstances where a person is incapacitated or otherwise unable to call for help.

In some applications, the wireless radio transponder is capable of both transmitting and receiving signals, thereby providing a two-way communication device that allows for the emergency response source (e.g., hospital, police, or fire emergency department) and/or the central call center to actively and/or remotely interrogate the vehicle emergency system or establish direct communication with the driver or a passenger of the vehicle. Accordingly, additional information can be acquired for assessing the emergency and determining the appropriate emergency response.

Adapting emergency call systems for use in a vehicle is complex and unique challenges arise in managing remote transfers of data to or from a disabled or damaged vehicle, which is especially true where emergency information routing systems differ among the various regions in which a vehicle can travel. The user interfaces alone are time-consuming to develop and to operate.

A number of advances have been made to effectively and safely manage the multitude of incoming distress signals and data at the receiving end of the emergency call systems, including the establishment and implementation of specific protocols and communication networks for responding to the signals. For example, these system protocols are capable of determining a priority for responding to the various incoming signals, deciphering whether or not an emergency has occurred despite errors in the signal or disablement of the emergency call device inside the vehicle, and allocating the distress signal and data to the appropriate emergency response team. Various system and call flow architectures exist that have been set aside and segregated specifically for the receiving side of the emergency call systems. These system architectures involve either government organized public emergency services, private third-party emergency services, or an interrelated combination of both.

FIG. 1 illustrates a diagram of a prior art emergency call (e-call) system. Present systems allow a communication device in the vehicle to dial a public safety answering point (PSAP). However, present systems have to rely on the PSAP to accept the types of calls presented by these systems. Information provided to the PSAP is provided only over a voice connection. For example, when a vehicle detects a crash, an associated wireless phone of the user dials 911. When the 911 call is answered by a live agent or call queuing system, the agent can use signaling to receive latitude/longitude coordinates from the vehicle and obtain voice from the vehicle occupant. Prior art systems rely on the wireless phone of the user and receive the location from either the vehicle's in-built hardware or from the phone's E911 infrastructure. If there is a problem determining the latitude/longitude of the vehicle from the vehicle or the wireless phone of the user, the vehicle occupant may experience a significant delay in receiving emergency services.

Prior art systems have significant disadvantages. As previously stated, all calls go directly to 911. Prior art systems provide no call screening capability. Further, there is no future support for new data and/or policies. Lastly, there is no way to adapt prior art systems to support local PSAP preferences, laws or regulations, especially where these preferences, laws, and regulations vary over time and geography.

Thus, a need exists to overcome the problems with the prior art systems, designs, and processes as discussed above.

SUMMARY OF THE INVENTION

The invention provides an emergency call or e-call system that overcomes the hereinafore-mentioned disadvantages of the heretofore-known devices and methods of this general type and that provide such features with a third-party service center or centers, e.g., Intrado, TCS, Northern 911, and/or government affiliated center or centers, e.g., PSAPs, for handling e-call voice and position data.

The systems and methods provided are applicable to all emergency call services or systems that exist in various locations where it would be beneficial to have a "hybrid" solution between the public emergency call system and a third-party service center. The system is initially triggered by an incoming emergency call (referred herein as an "e-call"), such as a voice signal, from a vehicle or mobile device that is relayed over a telecommunications channel. The transmission of the incoming emergency call can be activated, for example, by a motorist depressing an in-vehicle emergency button or by in-vehicle equipment automatically dialing a call upon detection of an emergency condition of the vehicle sensed by one or more sensors (e.g., an airbag deployment). A third-party service center receives the e-call. An example of a third-party service center or a third-party service provider is described in co-pending U.S. patent application Ser. No. 13/468,146, which is hereby incorporated herein by reference. Simultaneously, and in parallel with the voice signal, a set of data can be generated by the emergency system inside the vehicle (e.g., from an in-vehicle satellite positioning technology) and transmitted to the third-party service center using, for example, an in-band modem or SMS, or any other available data channel. In an exemplary embodiment, the voice and data signals may be transmitted using Data Over Voice (DOV), or in-band modem, technology. In another exemplary embodiment, the information in the data signals may be transmitted as a spoken audio signal on the voice channel. Data may also be sent as a packet data message over available data transmission channels other than SMS.

From the data signals, a variety of pertinent information regarding the nature of the emergency can be determined. This information can include, but is not limited to, the event that triggered the emergency call or signal, the physical location and condition of the vehicle (e.g., from crash/sensor data originating from the vehicle), the language preference of the driver, and the condition of the occupants inside the vehicle. Once the location of the vehicle is known, the third-party service center can then determine which PSAP is appropriate for responding to the emergency situation, for example, based upon the location of the vehicle.

Once the PSAP is selected, the third-party service center routes the call to the selected PSAP. The third-party service center is able to convert all of the necessary data information, e.g., vehicle sensor data or vehicle location, into speech audio files in a target language using, for example, "text-to-speech" technology. The target language depends on the language of the selected PSAP. The third-party service center transmits the audio files (e.g., WAV files) or the agreed upon data format between the PSAP and the service center that match the emergency call to a telephone or other communications portal of the selected PSAP in the language of the selected PSAP. In one exemplary embodiment, a unique identifier may be associated with the emergency call to ensure that the correct pre-defined audio files or data format are transmitted to the intended PSAP. Thus, once the third-party service center has established communication with the intended PSAP, the third-party service center plays announcements comprised of the e-call or other associated data to the PSAP in the target language, thereby minimizing any language barrier that might exist between the motorist and the PSAP.

With the foregoing and other objects in view, there is provided a method for providing emergency call (e-call) services using a third-party service center. A voice call is received from a vehicle. Dual tone multi-frequency, single tone, or other signaling is automatically sent to the vehicle over the voice call. Location information is received from the vehicle in response to the dual tone multi-frequency signaling. Voice and location information is forwarded to a PSAP database for subsequent forwarding to an appropriate PSAP. In one exemplary embodiment, information can be relayed to the PSAP using voice prompts. In one exemplary embodiment, information can be relayed to the PSAP using a data push. Information can also be relayed to the PSAP by putting data in a Session Initiation Protocol (SIP) header.

With the foregoing and other objects in view, there is provided a method for providing emergency call (e-call) services. A third-party service center receives a voice call from a vehicle. Signaling is automatically sent to the vehicle from the third-party service center over the voice call. Location information is received from the vehicle at the third-party service center in response to the signaling. Information is forwarded from the voice call and the location information to a public safety answering point (PSAP) determined by the third-party service center.

in accordance with a further mode, the PSAP is determined with a database containing characteristic information on a plurality of PSAPs.

In accordance with an added mode, the database is used to select the PSAP using voice and/or location information.

In accordance with an additional mode, the database is resident in an external device.

In accordance with yet another mode, the external device includes an emergency services call router connected to the third-party service center over an Internet connection.

In accordance with yet a further mode, the location information is captured from the voice call with an interactive voice recognition (IVR) unit of the third-party service center.

In accordance with yet an added mode, alternate position information is determined and the alternate position information is used to check the location information.

In accordance with yet an additional mode, the alternate position information is provided by a mobile device locator that determines the alternate position information using cellular network-based methods.

In accordance with again another mode, rogue or runaway devices are screened from reaching the PSAP.

In accordance with again a further mode, a live agent is used to determine position information when useable location information cannot be determined.

In accordance with again an added mode, a user is provided with an ability to layer additional services on the call due to an intervention of the live agent.

With the objects of the invention in view, there is also provided a system for providing emergency call (e-call) services. The system includes a vehicle e-call system, a plurality of public safety answering points (PSAPs), and a third party service center. The third party service center: receives a voice call from the vehicle e-call system; automatically sends signaling to the vehicle e-call system over the voice call; receives location information from the vehicle e-call system in response to the signaling; determines a selected one of the plurality of PSAPs; and forwards information from the voice call and the location information to the selected PSAP.

In accordance with a further feature, a database containing characteristic information on the plurality of PSAPs is used by the third party service center to determine the selected PSAP.

In accordance with an added feature, the database is used to select the PSAP using voice and/or location information.

In accordance with an additional feature, the database is resident in an external device.

In accordance with yet another feature, the external device includes an emergency services call router connected to the third-party service center over an Internet connection.

In accordance with yet a further feature, an interactive voice recognition unit of the third-party service center captures location information from the voice call.

In accordance with yet an added feature, alternate position information is determined and the alternate position information is used to check the location information.

In accordance with yet an additional feature, a mobile device locator provides the alternate position information and determines the alternate position information using cellular network-based methods.

In accordance with a concomitant feature, rogue or runaway devices are screened from reaching the PSAP.

Although the invention is illustrated and described herein as embodied in a method and apparatus for providing customization of public safety answering point information delivery, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Additional advantages and other features characteristic of the present invention will be set forth in the detailed description that follows and may be apparent from the detailed description or may be learned by practice of exemplary embodiments of the invention. Still other advantages of the invention may be realized by any of the instrumentalities, methods, or combinations particularly pointed out in the claims.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the present invention. Advantages of embodiments of the present invention will be apparent from the following detailed description of the exemplary embodiments thereof, which description should be considered in conjunction with the accompanying drawings in which.

DETAILED DESCRIPTION OF THE INVENTION

Figure 1:
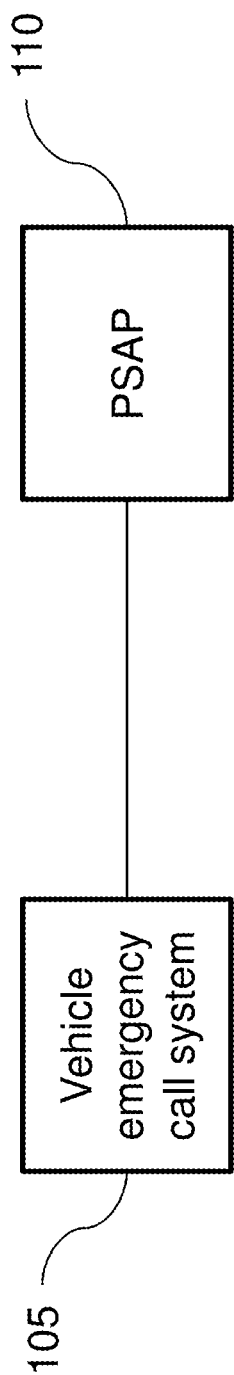
FIG. 1 is a block-circuit diagram of a prior art emergency call (e-call) system.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

Relational terms such as first and second, top and bottom, and the like may be used solely to distinguish one entity or action from another entity or action without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" or "approximately" applies to all numeric values, Whether or not explicitly indicated. These terms generally refer to a range of numbers that one of skill in the art would consider equivalent to the recited values (i.e., having the same function or result). In many instances these terms may include numbers that are rounded to the nearest significant figure.

It will be appreciated that embodiments of the invention described herein may be comprised of one or more conventional processors and unique stored program instructions that control the one or more processors to implement, in conjunction with certain non-processor circuits and other elements, some, most, or all of the functions of the powered injector devices described herein. The non-processor circuits may include, but are not limited to, signal drivers, clock circuits, power source circuits, and user input and output elements. Alternatively, some or all functions could be implemented by a state machine that has no stored program instructions, or in one or more application specific integrated circuits (ASICs) or field-programmable gate arrays (FPGA), in which each function or some combinations of certain of the functions are implemented as custom logic. Of course, a combination of these approaches could also be used. Thus, methods and means for these functions have been described herein.

The terms "program," "software," "software application," and the like as used herein, are defined as a sequence of instructions designed for execution on a computer system. A "program," "software," "application," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

Herein various embodiments of the present invention are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Figure 2:
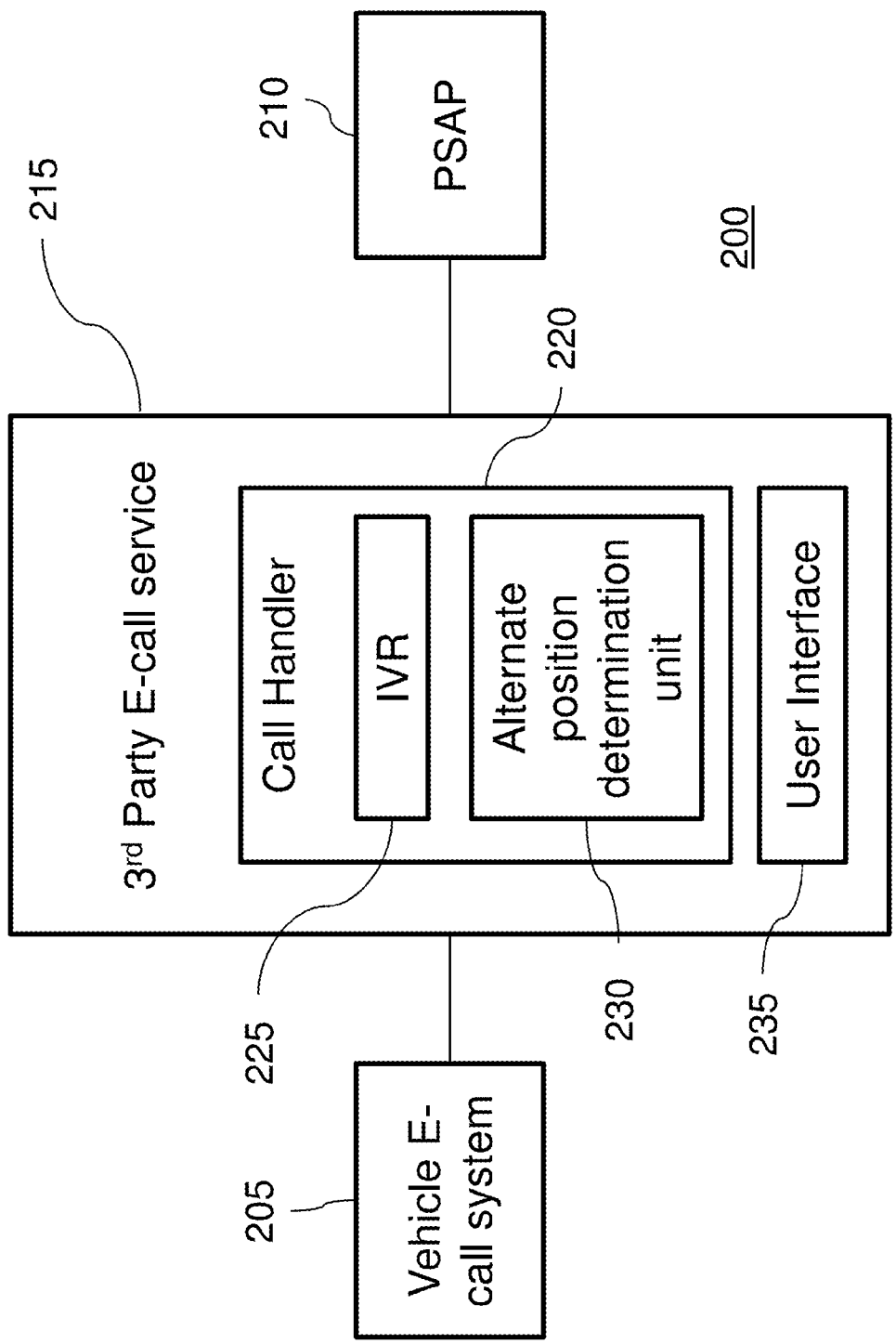
FIG. 2 is a block-circuit diagram of an exemplary embodiment of an e-call system.

Described now are exemplary embodiments of the present invention. Referring now to the figures of the drawings in detail and first, particularly to FIG. 2, there is shown a first exemplary embodiment of an e-call system 200. The e-call system 200 includes a vehicle e-call system 205, a third-party service center 215, and at least one PSAP 210. The vehicle e-call system 205 places a call, e.g., an SOS signal, to the third-party service center 215, the call being triggered, for example, by an automatic crash notification (ACN). In one exemplary embodiment, the call is placed through a phone of the driver that is paired to the vehicle using a short range wireless (SRW) protocol. In one exemplary embodiment, an embedded device, e.g., a telematics unit that is integrated with or user-removable from the vehicle, can be used to place the call and route the data. Other ways to trigger a call to the third-party service center include, but are not limited to, an interactive voice response system in the vehicle, an SOS button in the vehicle, or a mobile application of a user device paired to the vehicle 205. The vehicle 205 sends location data using a recorded or text-to-speech message. The syntax and structure of the message may vary, but the purpose of the message is to transfer, at a minimum, the location of the vehicle. An example of such a message is "Crash detected at Latitude: 33.05995 Longitude: −97.09884."

The third-party service center 215 automatically gathers data and initiates voice and data communication between the vehicle 205 and the PSAP 210 through the service center 215. The third-party service center 215 includes a call handler 220 (e.g., a server) that handles the e-calls. The call handler 220 includes an automatic interactive voice recognition (IVR) unit 225 to capture information in the voice portion of the call. The voice portion can include audio information representing the location and, optionally, the call reason and the customer's preferred language. The third-party service center 215 can provide services to customers who have not subscribed to enhanced services. For subscribers to enhanced services, the data may include other subscriber profile information and crash data as well. Subscriber profile information can be entered by the subscriber using a user interface 235 of the third-party service center 215, e.g., using a customer device such as a computer or a mobile phone that accesses the user interface 235 over the Internet. The IVR system of the third-party service center 215 recognizes the latitude and longitude from the voice portion of the call. From this latitude and longitude information, the third-party service center 215 identifies the appropriate PSAP 210 and routes the voice portion of the call and the location to the PSAP 210. The third-party service center 215 has attributes of the PSAP 210 predefined so that the routing is tailored to the particular characteristics of the PSAP 210. (As new PSAPs 210 are created, communication characteristics are defined and stored and made available to the third-party service center 215.) The voice portion of the call can be converted into at least one audio file or pre-defined data format for conveyance to the PSAP 210. The PSAP 210 and emergency agencies receive data and voice forwarded from the third-party service center 215 and respond.

The e-call service implemented by the third-party service center 215 is fully automated and can occur without involvement from a human agent. The third-party service center can determine and utilize the legal and preferred method for information delivery to the PSAP 210 based on the location of the vehicle.

In a possible scenario, the third-party service center determines that a vehicle is unable to provide a usable location. In one exemplary embodiment, the third-party service center 215 uses alternative automated methods to determine a location of the vehicle to pass to the PSAP. The alternate automated methods can be implemented, for example, by an alternate position determination unit 230. In one exemplary embodiment, when automated methods cannot be used to provide a usable location, the third-party service center 215 engages a human agent to resolve the location of the vehicle.

For example, some locations in which a PSAP 210 is situated consider certain prior art e-call systems as an auto-dial type call. For such PSAPs 210, the third-party service center 215 to which the voice call is routed understands the attributes of the PSAP 210 and the PSAP's choice/attribute to not accept audio delivery of automated information. For this particular PSAP 210, therefore, the third-party service center 215 engages a human agent for handling the e-call. In another example, a specific jurisdiction may possess a system that allows location of the vehicle to be sent through a session initiation protocol (SIP) or any other preferred data connection. In these cases, the third-party service center 215, after capturing the information from the vehicle, delivers the captured information to the PSAP 210 through the preferred data connection of that PSAP 210.

A configuration of this type allows for additional features to be added into the vehicle 205 without additional hardware requirements or vehicle modification. In one exemplary embodiment, a user can subscribe to enhanced services, which are activated in certain situations. The user can subscribe to these enhanced services through user interface 235. For example, when an ACN is generated from the vehicle 205, the third-party service center 215 can notify pre-defined emergency contacts. This enhanced service(s) can be provided prior to, simultaneous with, or subsequent to the third-party service center's 215 communication of data to the PSAP 210.

Figure 3:
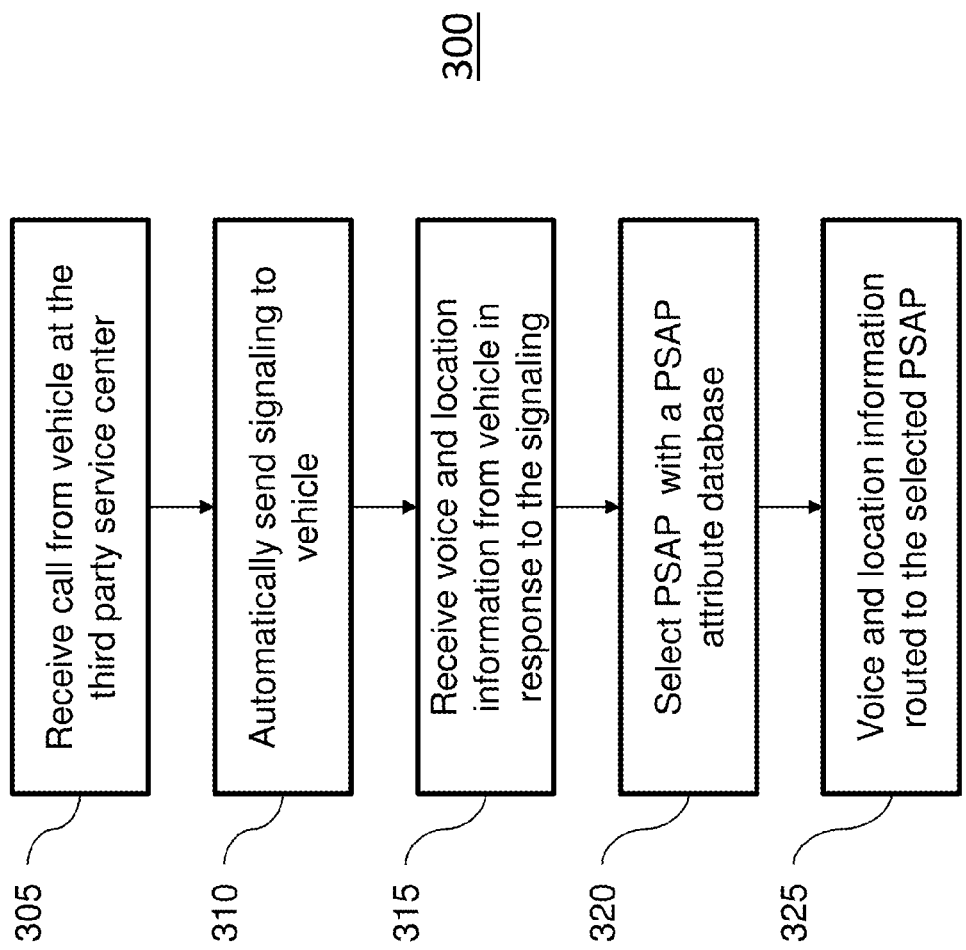
FIG. 3 is a flow chart of an exemplary embodiment of a system for providing an e-call service.

FIG. 3 is a flow chart of an exemplary embodiment of a method 300 for providing an e-call service. At block 305, a call, e.g., an SOS signal, is received at a third-party service center 215 from a vehicle. At block 310, signaling, which may be DTMF, single tone, or other signaling measures are sent automatically from the third-party service center 215 to the vehicle. In response to the signaling, voice and location information is received from the vehicle at block 315. Upon receipt, at block 320, the third-party service center 215 selects a receiving PSAP 210 utilizing a PSAP database containing location and attribute data for all PSAPs. At block 325, the voice and location information is forwarded to the selected recipient PSAP 210.

Figure 4:
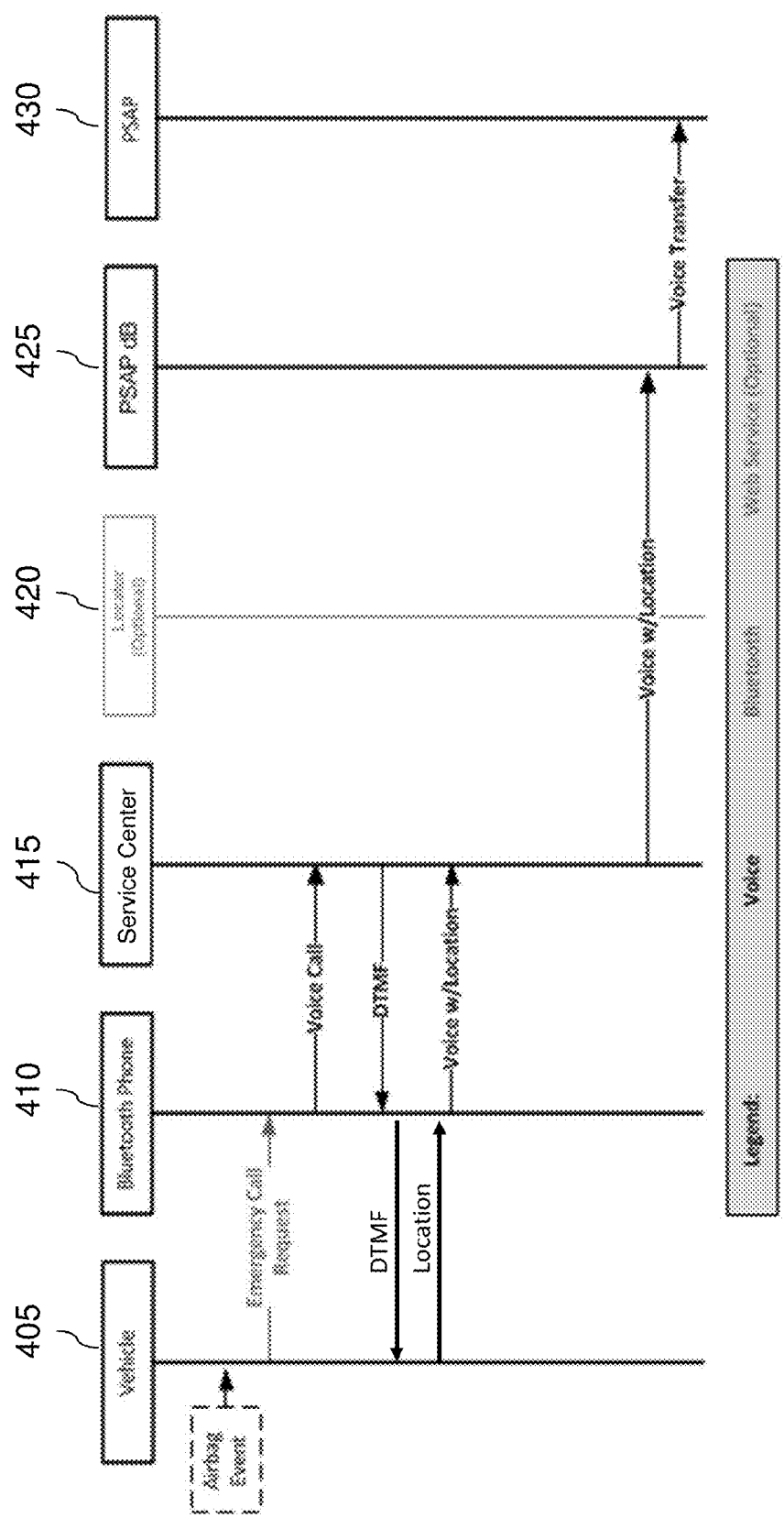
FIG. 4 is a state-flow diagram of an exemplary embodiment of a system for providing an e-call service.

FIG. 4 illustrates a state-flow diagram of an exemplary embodiment of a system for providing an e-call service. A vehicle 405 receives an indication of an event, e.g., an indication that an airbag has deployed. The vehicle 405 sends an emergency call request to a mobile device 410 (e.g., a phone) that is connected with the vehicle 405 using a short-range wireless (SRW) technology. For example, the vehicle 405 can be paired with the phone 410 using Bluetooth. (The methods described herein are not limited to using Bluetooth technology.) Other SRW technologies such as Wi-Fi direct or other personal area network (PAN) and/or local area network (LAN) technologies can be used to connect a mobile device 410, e.g., phone, with the vehicle 405. The phone 410 initiates a voice call with the third-party service center 415. The third-party service center 415 automatically sends DTMF signaling through the phone 410 to the vehicle 405. Although DTMF signaling is shown in FIG. 4, single tone, or other signaling measures can also be used. The DTMF signaling is interpreted by components in the vehicle 405. In response to the DTMF signaling, the vehicle 405 sends voice and location information to the third-party service center 415. The third-party service center 415 sends the voice and/or location information to a PSAP database 425, which is utilized to select an appropriate PSAP 430 to receive the call. The PSAP database 425 and/or the third-party service center 415 transfers the voice information to the appropriate PSAP 430 based on the location information received. In one exemplary embodiment, the PSAP database 425 resides at the third-party service center 215, 415. In another exemplary embodiment, the PSAP database 425 is resident in an external device, e.g., an emergency services call router, connected to the third-party service center 415, for example, over the Internet.

FIG. 4 also shows an optional mobile device locator 420. The mobile device locator 420 can be used to determine position information using cellular network-based methods, which are known to those skilled in the art and are not repeated herein for the sake of brevity. A method and system including a mobile device locator 420 is discussed with respect to FIGS. 5 and 6.

Figure 5:
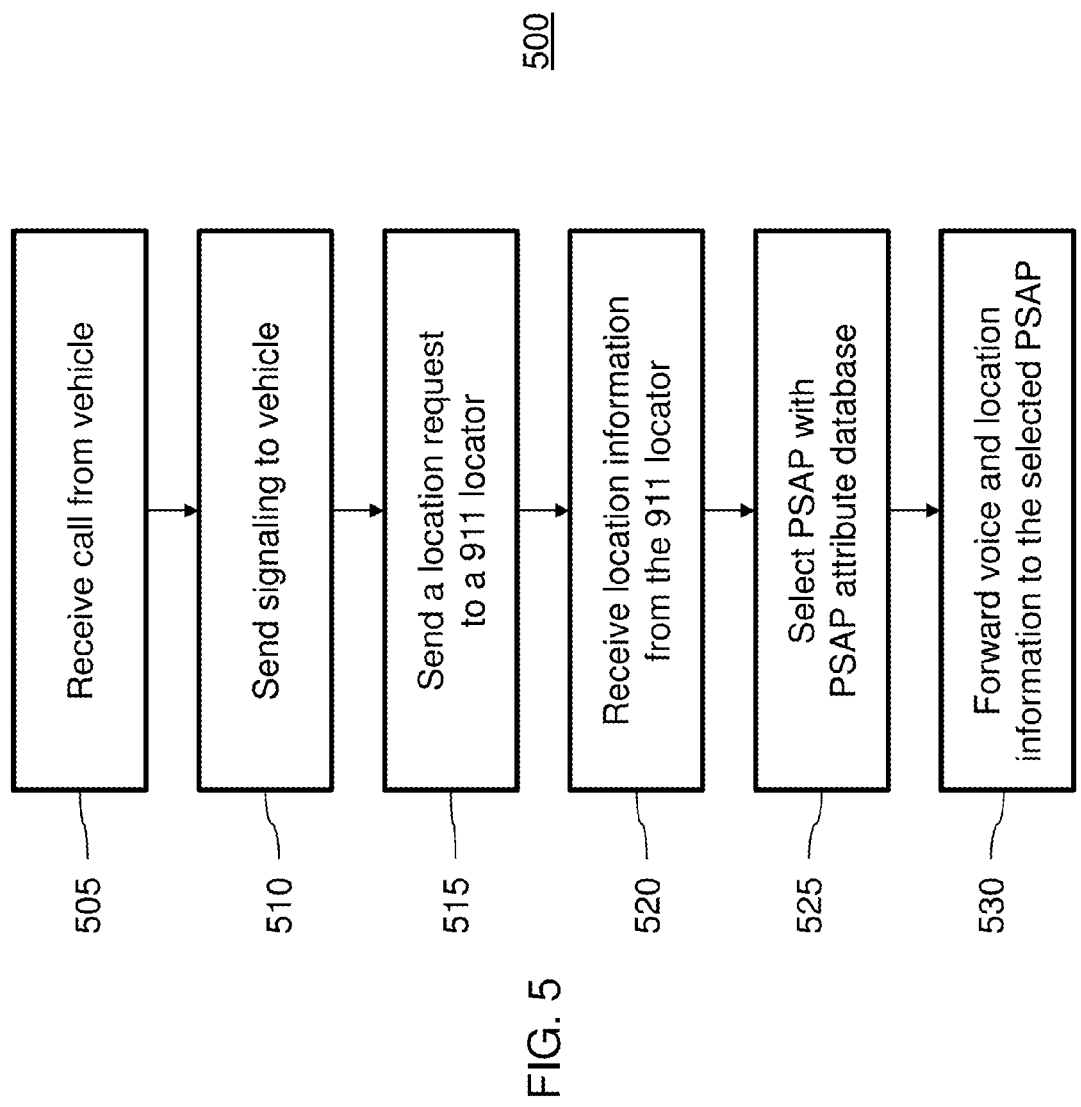
FIG. 5 is a flow chart of an exemplary embodiment of a method for providing an e-call service.

FIG. 5 is a flow chart of an exemplary embodiment of a method 500 for providing an e-call service where location information is unavailable. At block 505, a call, e.g., an SOS signal, is received at a third-party service center 415 from a vehicle 405. At block 510, signaling, which may be DTMF, single tone, or other signaling measures, is sent from the third-party service center 415 to the vehicle. Voice information is received from the vehicle, however, position information has not been received in response to the signaling. In order to determine position information of a vehicle, at block 515, a location request is sent to a mobile device locator. At block 520, the location information is received by the third-party service center 415 from the mobile device locator. At block 525, the third-party service center 415 sends the voice and/or location information to a PSAP database 425, which is utilized to select an appropriate PSAP 430 to receive the call. Finally, in block 530, the PSAP database 425 and/or the third-party service center 415 transfers the voice information to the appropriate PSAP 430 based on the location information received.

Figure 6:
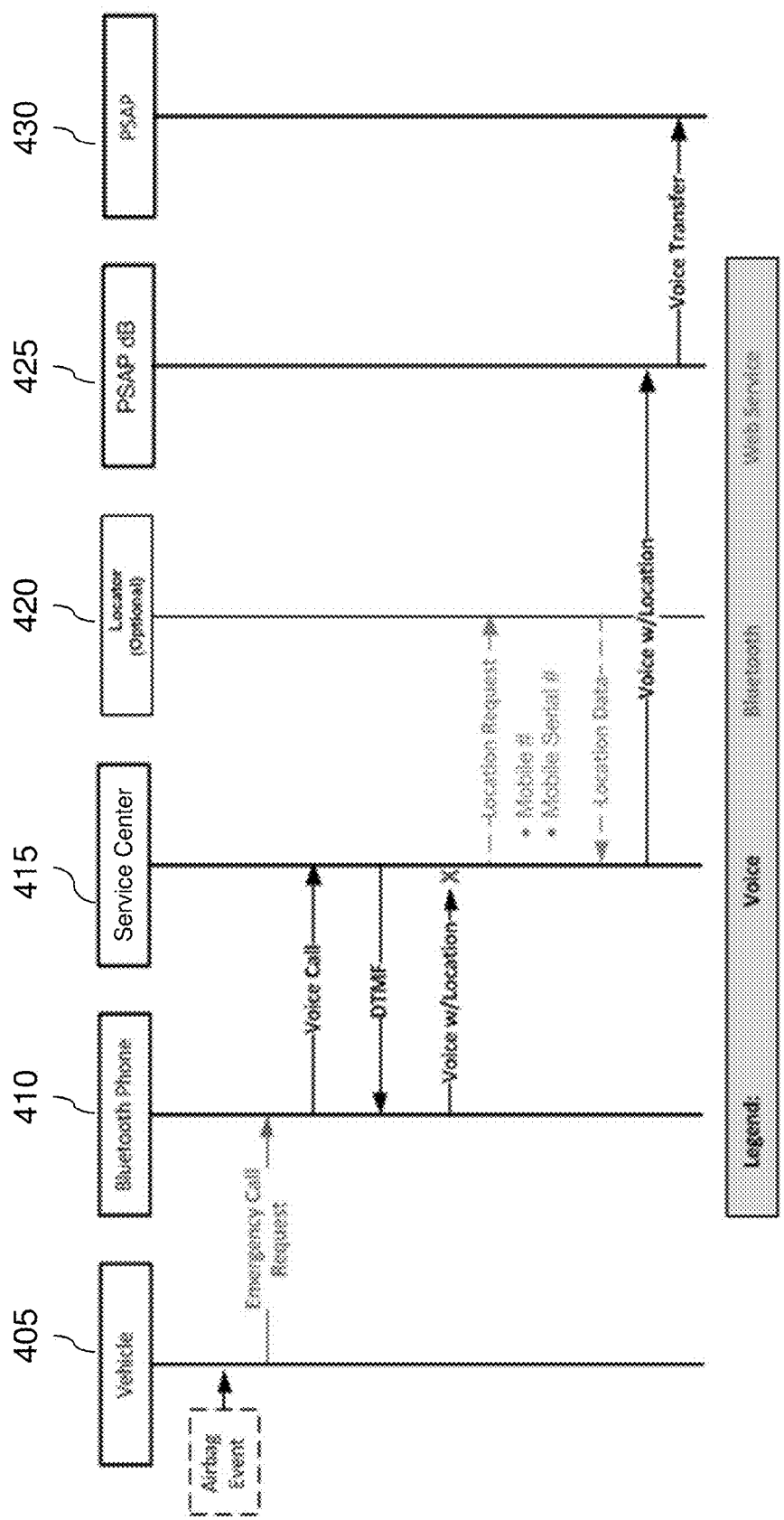
FIG. 6 is a state-flow diagram of an exemplary embodiment of a system for providing an e-call service.

FIG. 6 illustrates a state-flow diagram of an exemplary embodiment of a system for providing an e-call service where location information is unavailable. The vehicle 405 receives an indication of an event, e.g., an indication that an airbag has deployed. The vehicle 405 sends an emergency call request to a mobile device 410 (e.g., a phone) that is connected to the vehicle 405 using a short-range wireless technology. For example, the vehicle 405 can be paired with the phone 410 using an SRW technology. The phone 410 initiates a voice call with the third-party service center 415. The third-party service center 415 sends signaling to the vehicle 405 through the phone 410. In this example, voice data is received from the phone 410 but position information cannot be determined. When DTMF, single tone, or other signaling does not return useable position information to the third-party service center 415, the third-party service center 415 sends a location request to a mobile device locator 420. The location request message sent to the mobile device locator 420 may include, for example, a mobile number and/or a mobile serial number of the phone 410. In one exemplary embodiment, a temporary local directory number (TLDN) can be retrieved. Using a TLDN can preserve confidentiality in some cases. The TLDN can also he used to deal with other issues such as contacting a phone that is roaming outside of its home area or communicating with a phone that has a dedicated non-traditionally dial-able phone. In response to the location request message, the mobile device locator 420 sends the location data of the phone. The third-party service center 415 sends the voice and/or location information to the PSAP database 425 or processes the voice and/or location data with the PSAP database 425. Based upon the analysis by the PSAP database 425, the voice information is transferred to an appropriate PSAP 430, which can be dependent upon the location information.

Figure 7:
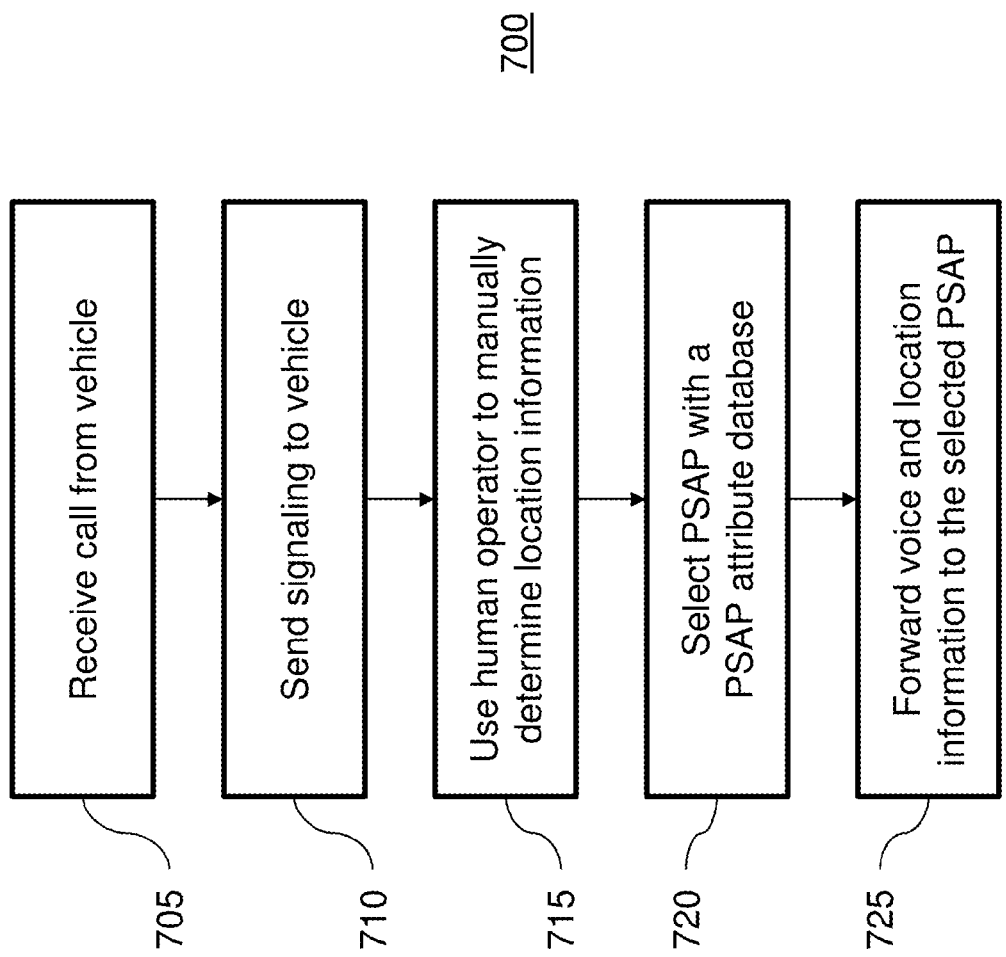
FIG. 7 is a flow chart of an exemplary embodiment of a method for providing an e-call service.

FIG. 7 is a flow chart of an exemplary embodiment of a method 700 for providing an e-call service with a human operator. At block 705, a call, e.g., an SOS signal, is received at a third-party service center 415 from a vehicle 405. At block 710, DTMF, single tone, or other signaling measures are sent from the third-party service center 415 to the vehicle 405. Voice information is received from the vehicle, however, useable position information has not been received in response to the signaling. In order to determine position information of a vehicle, at block 715, a human operator manually determines the location information. At block 720, the third-party service center 415 sends the voice and/or location information to a PSAP database 425, which is utilized to select an appropriate PSAP 430 to receive the call. Finally, in block 725, the PSAP database 425 and/or the third-party service center 415 transfers the voice information to the appropriate PSAP 430 based on the location information received.

Figure 8:
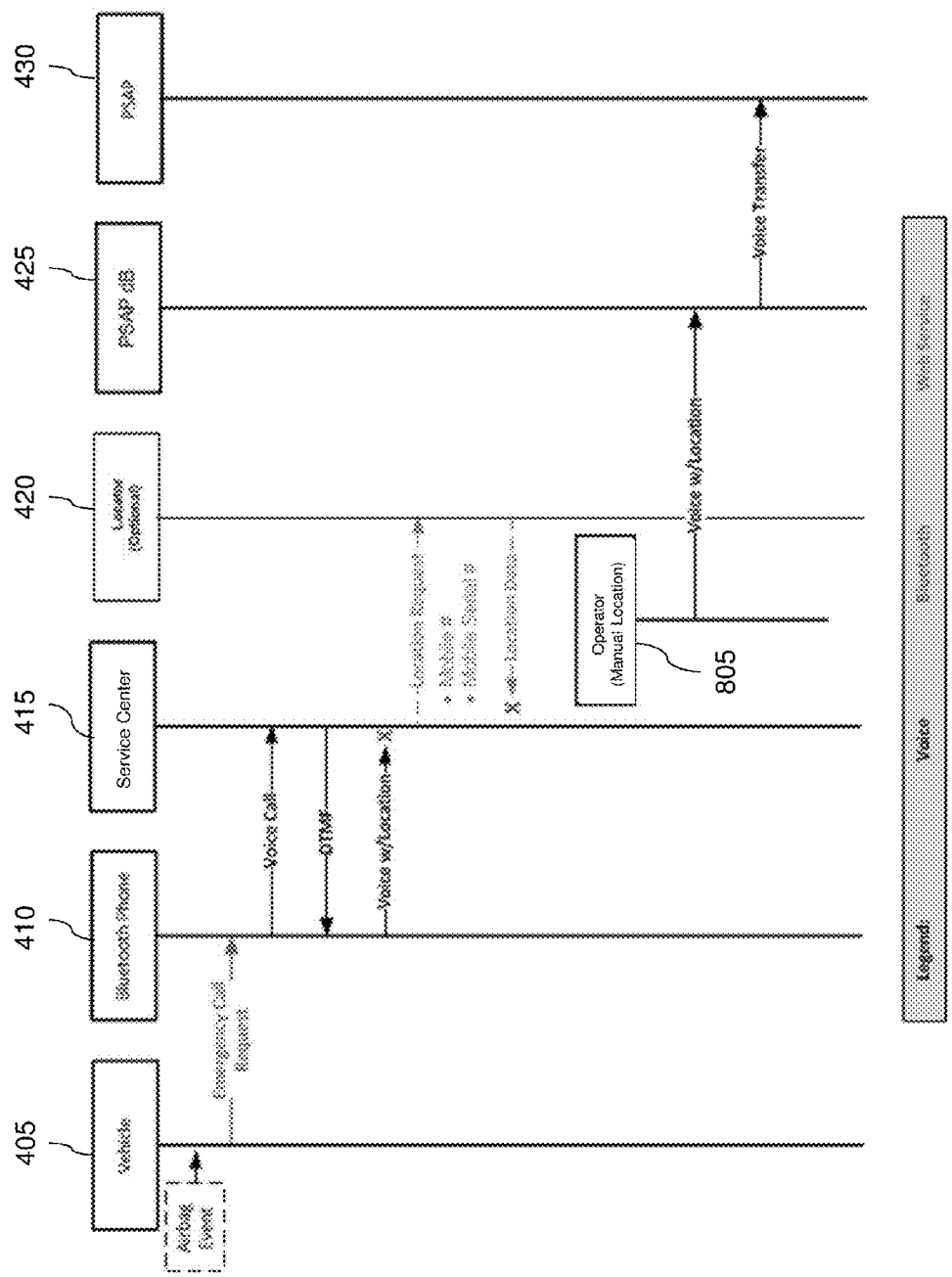
FIG. 8 is a state-flow diagram of an exemplary embodiment of a method for providing an e-call service.

FIG. 8 is a state-flow diagram of an exemplary embodiment of a method for providing an e-call service with a human operator. The vehicle 405 receives an indication of an event, e.g., an indication that an airbag has deployed. The vehicle 405 sends an emergency call request to a mobile device 410 (e.g., a phone) that is connected to the vehicle 405 using a short-range wireless technology. For example, the vehicle 405 can be paired with the phone 410 using Bluetooth. The phone 410 initiates a voice call with the third-party service center 415. Third-party service center 415 sends DTMF, single tone, or other signaling to the phone 410. In this example, voice data is received from the phone 410 but position information cannot be determined. When signaling does not return useable position information to the third-party service center 415, the third-party service center 415 may use a human operator 805 to manually determine position information. Once the location/position information has been determined, the operator 805 sends the voice and location information to a PSAP database 425 or processes the voice and/or location data with the PSAP database 425. Based upon the analysis by the PSAP database 425, the voice information is transferred to an appropriate PSAP 430, which can be dependent upon the location information. In one exemplary embodiment, due to the intervention of the live agent 805, the user has the ability to layer additional services onto the call handling.

Figure 9:
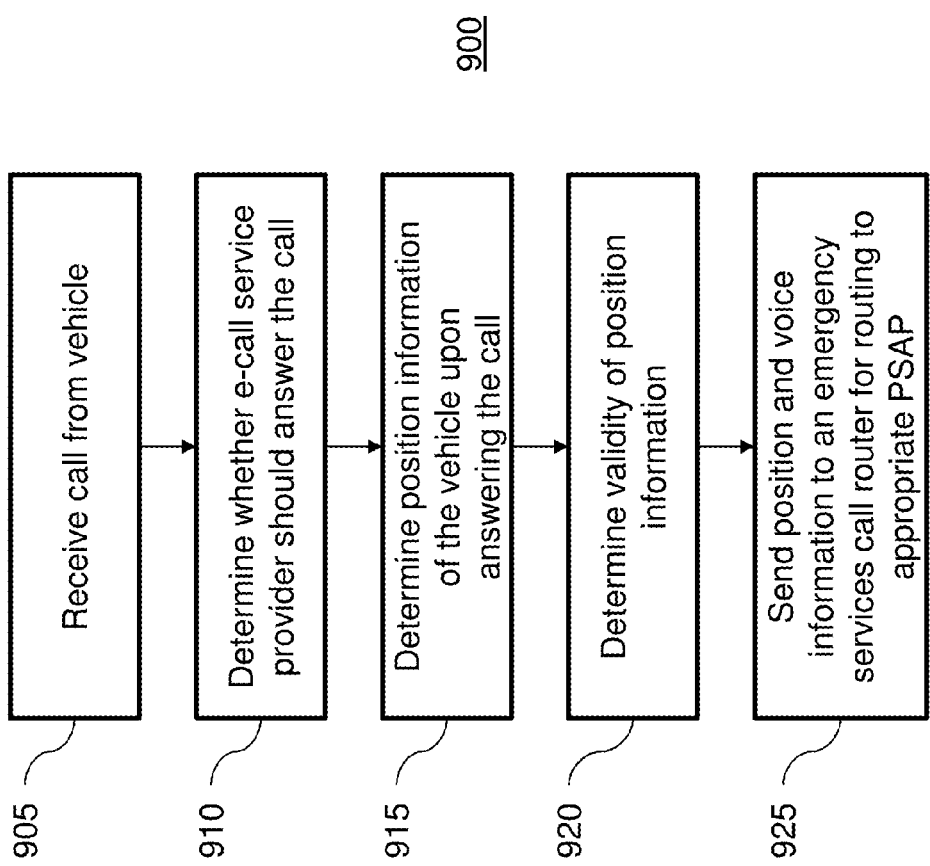
FIG. 9 is a flow chart of an exemplary embodiment of a method for providing an e-call service.

FIG. 9 is a flow chart of an exemplary embodiment of a method 900 for providing an e-call service with a rogue or runaway handling procedure. At block 905, a call is received from a vehicle. At block 910, the third-party service center 415 determines whether the call should be answered. A private branch exchange (PBX) or microcontroller (e.g., an AVR) of the third-party service center 415 monitors an incoming call queue. In one exemplary embodiment, the third party service center 415 is able to directly receive mobile voice over IP (VoIP) calls, complete with data in the SIP header. The PBX or AVR determines whether the calling device is a rogue or runaway. In one exemplary embodiment, a rogue or runaway device is described as a device that places a certain amount of calls within a certain time period. If it is determined that the device is a rogue or runaway, the third-party service center 415 initiates rogue/runaway device handling procedures. If it is determined that the call is a valid call, the PBX/AVR answers the call. At block 915, position information is determined for the vehicle upon answering the call. To obtain position information, the third-party service center 415 can use, for example, an identifier of the calling device to obtain a network position of the mobile device 410 (e.g., a phone). The third-party service center 415 also can use DTMF signaling over a voice portion of the call to determine position information. When DTMF signaling is used, an IVR of the third-party service center listens for the voice portion of the call from the vehicle (or paired device). If the information from the voice portion is invalid, the third-party service center 415 initiates silent or invalid voice procedures. Examples of silent or invalid voice information is noisy or garbled audio or audio that cannot be transcribed. If the voice information is valid, the IVR of the third-party service center 415 automatically sends DTMF signaling, e.g., a DTMF tone. The IVR listens for a position to be received from the vehicle (or paired device). Once position information is received, the data is transcribed by the IVR. In one exemplary embodiment, other data types or media, such as image(s) or video(s) can be sent by the vehicle in order, for example, to assess an accident scene to bettor tailor a response.

At block 920, the validity of the position information is determined. The IVR determines whether a valid position has been received using the voice prompts. If a valid position has not been determined using voice prompts, the third-party service center 415 initiates silent or invalid position procedures. If a valid position has been received using the voice prompts, the third-party service center 415 then determines whether the network position is valid. If the network position is valid, the third-party service center compares the voice prompt position to the network position. The third-party service center 415 then determines whether the voice prompt position and the network position are consistent. If the position information is inconsistent, the third-party service center 415 initiates position inconsistency procedures. If the position information is consistent, the valid transcribed voice prompt position is used at block 925. Likewise, if the network position is invalid, the valid transcribed voice prompt position information is used at block 925. At block 925, the position and voice information is sent to an emergency services call router for routing to an appropriate PSAP.

Figure 10:
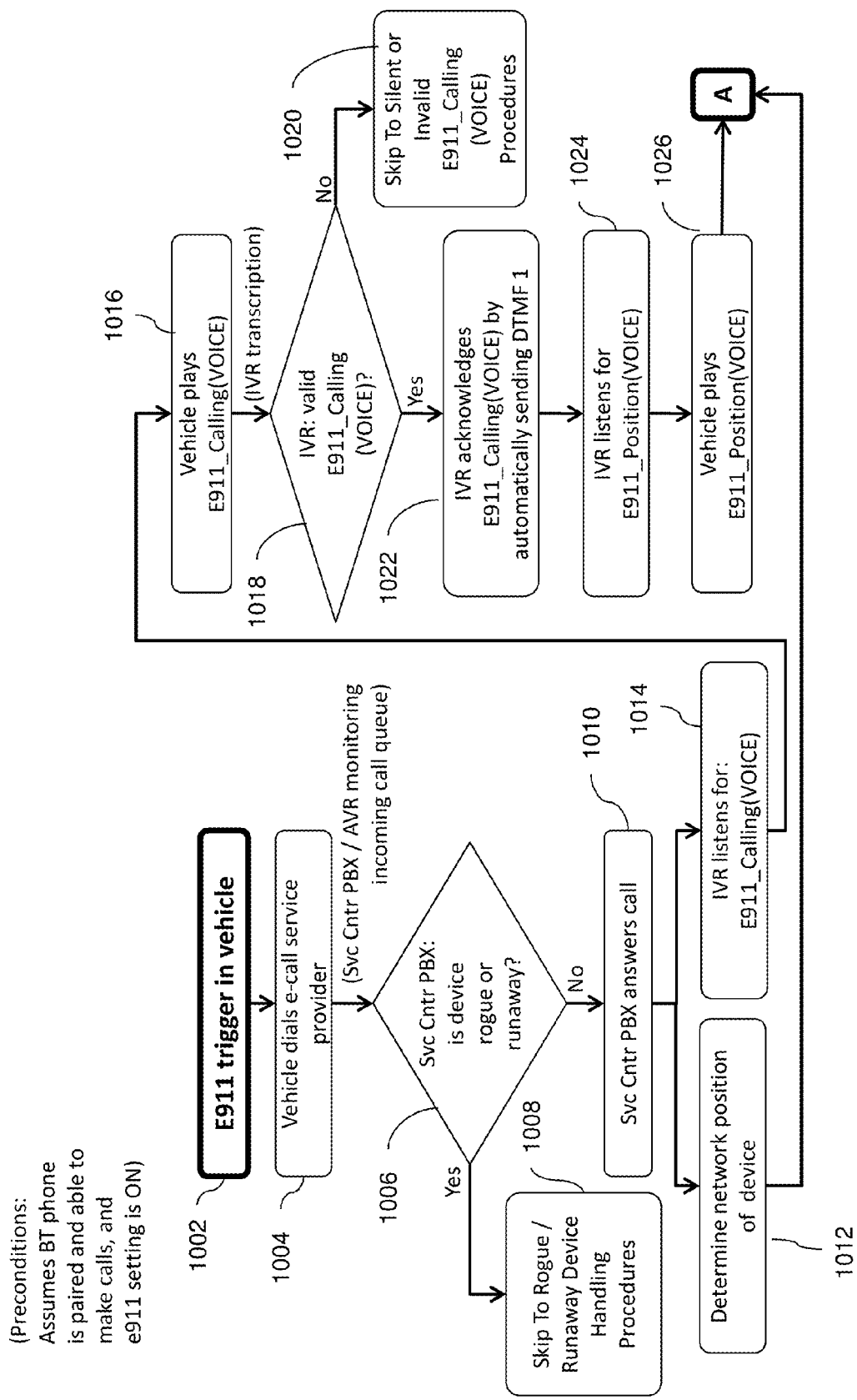
FIG. 10 is a first portion of a flow chart of an exemplary embodiment of a method for providing an e-call service.
Figure 11:
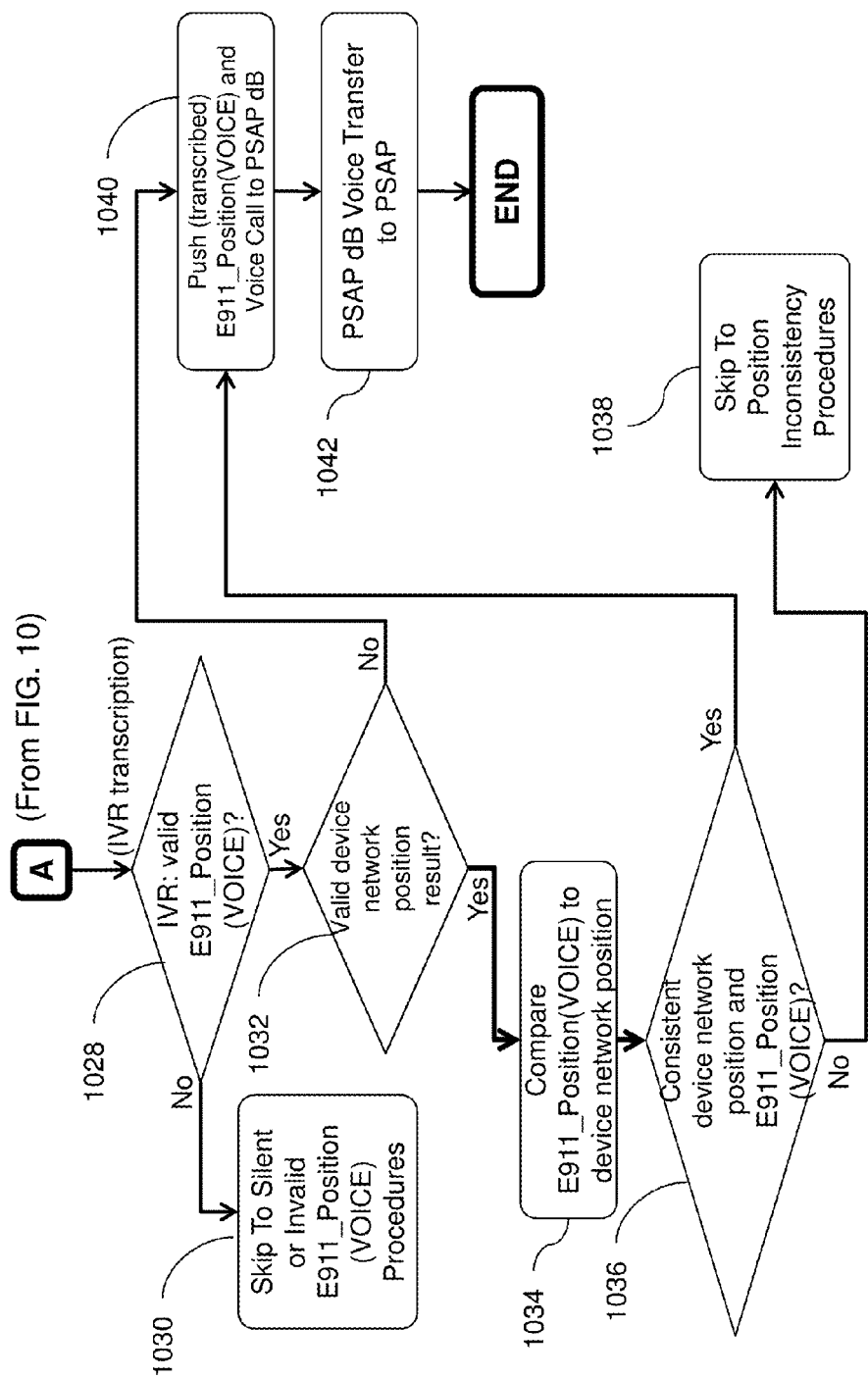
FIG. 11 is a second portion of the flow chart of FIG. 10.

FIGS. 10 and 11 illustrate a flow chart of an exemplary embodiment of a method for providing an e-call service with E911. This exemplary method assumes that a phone is paired to a vehicle using Bluetooth or some other short range wireless protocol and an E911 setting is fixed to 'ON' at the vehicle or an application on the phone. At block 1002, an E911 is triggered in the vehicle. At block 1004, the vehicle (or a paired phone) dials a phone number of the third-party service center 415. When the call is received from the vehicle, the third-party service center 415 determines whether the call should be answered. A private branch exchange (PBX) or microcontroller, e.g., an AVR, of the third-party service center 415 monitors an incoming call queue. At block 1006, the PBX or AVR determines whether the calling device is a rogue or runaway. If it is determined that the device is a rogue or runaway, the third-party service center 415 initiates rogue/runaway device handling procedures in order to screen calls from these devices from reaching the PSAP at block 1008. If it is determined that the call is a valid call, the PBX/AVR answers the call at block 1010.

Alternate position information is determined, e.g., using alternate position information unit 230, for the vehicle upon answering the call. To obtain alternate position information, the third-party service center 415 uses, for example, a network position of the calling device, e.g., mobile device 410 at block 1012.

The third-party service center 415 also is capable of using DTMF signaling over a voice channel to determine position information. When DTMF signaling is used, an IVR of the third-party service center 415 listens for an E911 calling signal from the vehicle (or paired device) at block 1014. At block 1016, the vehicle plays an E911 calling signal over the voice call.

At block 1018, an IVR of the third-party service center determines whether the E911 calling signal is valid. If the E911 calling signal is invalid, the third-party service center initiates silent or invalid E911 calling signal procedures at block 1020. If the E911 calling signal is valid, the IVR of the third-party service center 415 automatically sends DTMF signaling, e.g., DTMF 1, at block 1022. At block 1024, the IVR listens for E911 position information to be received from the vehicle (or paired device). At block 1026, the vehicle plays the E911 position over the call. Once E911 position information is received, the data is transcribed by the IVR.

The validity of the position information is then determined. At block 1028, the IVR determines whether a valid E911 position has been received. If a valid E911 position has not been determined, the third-party service center 415 initiates silent or invalid position procedures at block 1030. If a valid E911 position has been received, the third-party service center 415 then determines whether the DIP network position is valid at block 1032.

If the device network position is valid, the third-party service center 415 compares the voice prompt position to the device network position at block 1034. The third-party service center 415 then determines whether the voice prompt position and the device network position are consistent at block 1036. If the position information is inconsistent, the third-party service center initiates position inconsistency procedures at block 1038. If the position information is consistent, the valid transcribed E911 position is used at block 1040.

Likewise, if the device network position is invalid, the valid transcribed voice prompt position info at ion is used at block 1040. In one exemplary embodiment, inconsistency between the device network position and the voice derived location can be resolved through the use of a human agent at the third-party service center 415.

At block 1040, the transcribed valid E911 position and the voice call are pushed to an emergency services call router, e.g., PSAP dB 425. At block 1042, the emergency services call router routes the position information and voice call to the PSAP.

In one exemplary embodiment, a vehicle may send a valid request from a valid location, however, a driver of the vehicle does not want PSAP assistance. For example, a use (e.g., a driver of the vehicle) may be involved in a single car accident with a tree and the driver desires a personal resolution without police assistance. Calls of this type occur over 25% of the time. Police receive calls only to be told not to dispatch.

Figure 12:
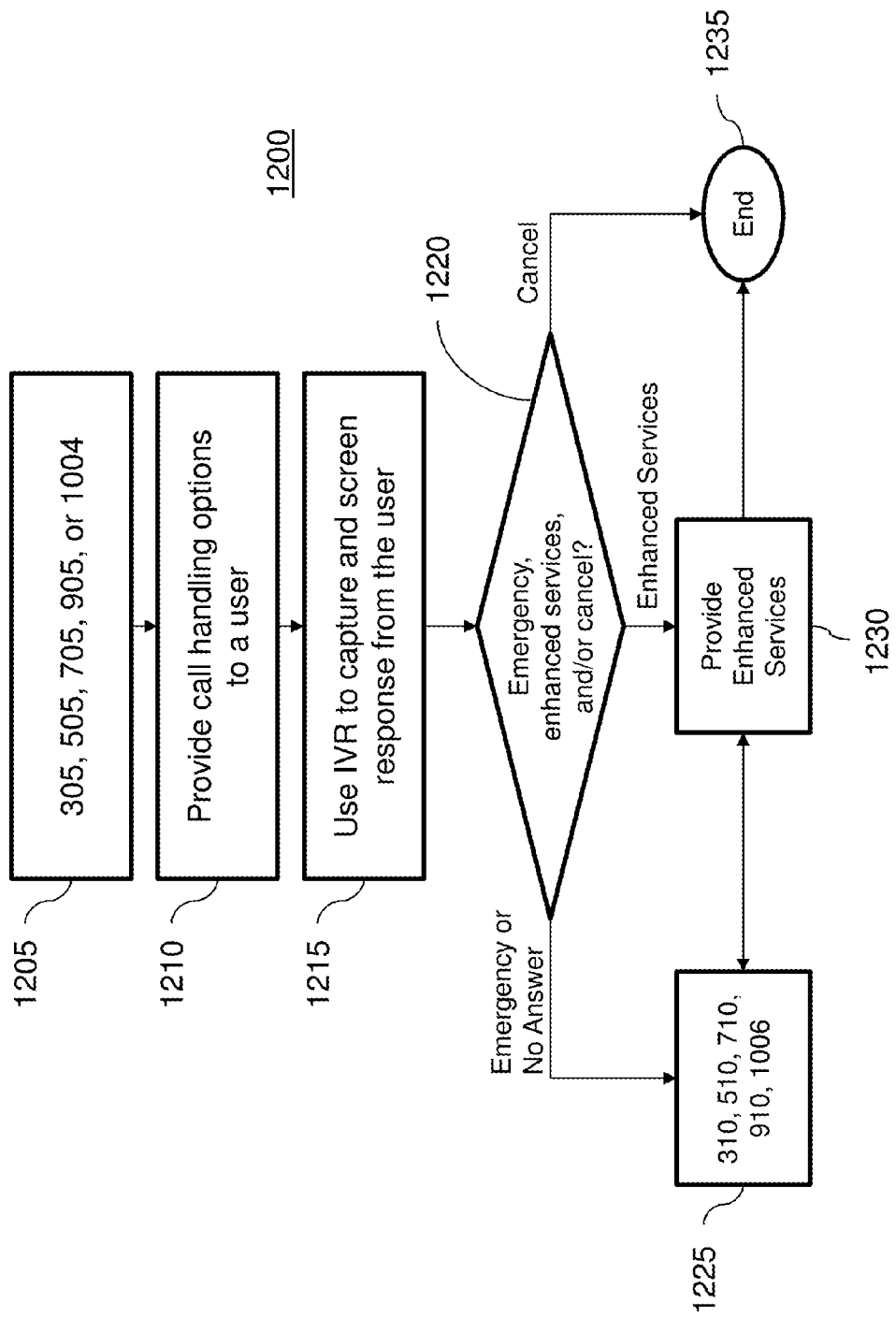
FIG. 12 is a flow chart of an exemplary embodiment of a method for providing an e-call service.

FIG. 12 illustrates a flow chart of an exemplary embodiment of a method for providing an e-call service. At block 1205, after receiving a call from a vehicle, e.g., at blocks 305, 505, 705, 905, or 1004 of FIG. 3, FIG. 5, FIG. 7, FIG. 9, or FIG. 10, respectively, the third-party service center provides a call handling option to a user at block 1210. The third-party service center can send an audio message over the voice channel to the driver of the vehicle. For example, the driver of the vehicle can be asked "Are you requesting emergency services, contact notification, or cancel?" At block 1215, IVR is used to capture and screen a response from the user. At block 1220, options for handling the call as an emergency call, selecting enhanced services, and/or canceling the call are provided to the user. When a user elects to cancel a call, the call ends at block 1235.

At block 1225, an indication that the emergency call option has been selected by the user is received. At this point, the method proceeds to blocks 310, 510, 710, 910, or 1006 of FIG. 3, FIG. 5, FIG. 7, FIG. 9, or FIG. 10, respectively. If no answer is provided to the IVR, the method proceeds to blocks 310, 510, 710, 910, or 1006 as previously stated unless the device is a rogue device. Enhanced services can be utilized in addition to emergency services at block 1230.

At block 1230, an indication that the enhanced services option has been selected by the user is received. Enhanced services can include, but are not limited to, private accident handling, insurance notification, replacement vehicle coordination, or third party notifications. After the user selects enhanced services, the user can elect the emergency call option at block 1225 or end the call at block 1235.

The e-call systems and processes disclosed herein provides numerous benefits. The present e-call system speeds up the emergency dispatch process by eliminating voice-based call transfer to PSAPs. Service migration is enabled to support response specialist delivered emergency services. The cost for service delivery is lowered. The e-call system supports server-based adjustments to service delivery, which ensures compliance with legislation and optimal handling of calls for customer protection. For example, if a PSAP decides not to accept "auto-dial" calls any longer, the e-call system can adjust call handling in the server. Lastly, a personal level of service can be retained, for example, when an enhanced service like emergency contact notification is used.

It is noted that various individual features of the inventive processes and systems may be described only in one exemplary embodiment herein. The particular choice for description herein with regard to a single exemplary embodiment is not to be taken as a limitation that the particular feature is only applicable to the embodiment in which it is described. All features described herein are equally applicable to, additive, or interchangeable with any or all of the other exemplary embodiments described herein and in any combination or grouping or arrangement. In particular, use of a single reference numeral herein to illustrate, define, or describe a particular feature does not mean that the feature cannot be associated or equated to another feature in another drawing figure or description. Further, where two or more reference numerals are used in the figures or in the drawings, this should not be construed as being limited to only those embodiments or features, they are equally applicable to similar features or not a reference numeral is used or another reference numeral is omitted.

The phrase "at least one of A and B" is used herein and/or in the following claims, where A and B are variables indicating a particular object or attribute. When used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables.

The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for providing emergency call services, which comprises:
   receiving at an automated third-party service center a communication from a vehicle over a data channel;
   automatically sending signaling to the vehicle from the third-party service center;
   receiving at the third-party service center over the data channel in response to the signaling, synthetic audio in the form of recorded audio or text-to-speech message from the vehicle, the synthetic audio being generated by a vehicle e-call system and representing location information comprising at least latitude and longitude coordinates of the vehicle;

using an automated speech recognition system located at the third-party service center, transcribing from the synthetic audio and into text data at least the latitude and longitude coordinates to determine if the coordinates are valid; and if the coordinates are valid, automatically forwarding information from the vehicle communication and the location information to a public safety answering point (PSAP) determined by the third-party service center.

2. The method according to claim 1, wherein the speech recognition system accepts packet audio data.

3. The method according to claim 1, which further comprises determining the PSAP with a database containing characteristic information on a plurality of PSAPs.

4. The method according to claim 3, which further comprises utilizing the database to select the PSAP using voice and/or location information.

5. The method according to claim 4, wherein the database is resident in an external device.

6. The method according to claim 5, wherein the external device comprises an emergency services call router connected to the third-party service center over an Internet connection.

7. The method according to claim 1, which further comprises determining alternate position information and using the alternate position information to check the location information.

8. The method according to claim 7, wherein the alternate position information is provided by a mobile device locator that determines the alternate position information using cellular network-based methods.

9. The method according to claim 1, which further comprises using a live agent to determine the location information when useable location information cannot be determined automatically.

10. A system for providing emergency call services, which comprises:
a vehicle e-call system;
a plurality of public safety answering points (PSAPs); and
an automated third-party service center that:
receives a communication from the vehicle e-call system over a data channel;
automatically sends signaling to the vehicle e-call system in response to the communication received from the vehicle e-call system;
in response to the signaling, receives synthetic audio from the vehicle e-call system over the data channel, the synthetic audio being in the form of recorded audio or a text-to-speech message and representing location information comprising at least latitude and longitude coordinates of the vehicle;
using an automated speech recognition system located at the third-party service center, transcribing from the synthetic audio and into text data at least the latitude and longitude coordinates to determine if the coordinates are valid;
if the coordinates are valid, determines a selected one of the plurality of PSAPs; and
automatically forwards information from the vehicle communication and the location information to the selected PSAP.

11. The system according to claim 10, wherein the speech recognition system accepts packet audio data.

12. The system according to claim 10, wherein the plurality of public safety answering points (PSAPs) each have characteristic information and further comprising a database containing the characteristic information on the plurality of PSAPs used by the third-party service center to determine the selected PSAP.

13. The system according to claim 12, wherein the third-party service center accesses the database to select the PSAP using voice and/or location information.

14. The system according to claim 13, wherein the database is resident in an external device.

15. The system according to claim 14, wherein the external device comprises an emergency services call router connected to the third-party service center over an Internet connection.

16. The system according to claim 10, wherein the third-party service center determines alternate position information and uses the alternate position information to check the location information.

17. The system according to claim 16, further comprising a mobile device locator that provides the alternate position information and determines the alternate position information using cellular network-based methods.

18. The system according to claim 10, wherein the third-party service center screens rogue or runaway devices from reaching the PSAP.

* * * * *